United States Patent [19]
Ditto

[11] 3,772,765
[45] Nov. 20, 1973

[54] FRICTION WELDING METHOD
[75] Inventor: Edwin D. Ditto, Sandusky, Ohio
[73] Assignee: General Motors Corporation, Detroit, Mich.
[22] Filed: Sept. 29, 1971
[21] Appl. No.: 184,660

[52] U.S. Cl. .................. 29/470.3, 156/73, 228/2
[51] Int. Cl. ............................. B23k 27/00
[58] Field of Search ............... 29/470.3; 228/2; 156/73

[56] References Cited
UNITED STATES PATENTS
| | | | |
|---|---|---|---|
| 3,235,162 | 2/1966 | Hollander | 29/470.3 |
| 3,599,857 | 8/1971 | Loyd et al. | 29/470.3 X |
| 3,627,189 | 12/1971 | Ditto et al. | 29/470.3 X |
| 3,699,639 | 10/1972 | Ditto et al. | 29/470.3 |

Primary Examiner—J. Spencer Overholser
Assistant Examiner—Robert J. Craig
Attorney—W. E. Finken et al.

[57] ABSTRACT

A flywheel driven through a one-way clutch by a motor can be selectively clutched to a drive spindle and connected chuck to relatively rotate workpieces which are moved into engagement under load. After expenditure of a portion of its stored energy, the rotating flywheel is released so that it can be readily accelerated by the motor under low load to a predetermined speed and energy level for another friction welding operation. The remaining stored energy in the rotating spindle and parts connected thereto is employed to complete the friction weld after flywheel release. A positioning device to facilitate loading of the workpieces into the chuck from a loader, an auxiliary brake to shorten friction weld times after flywheel release, and means for removing weld flash are disclosed.

4 Claims, 4 Drawing Figures

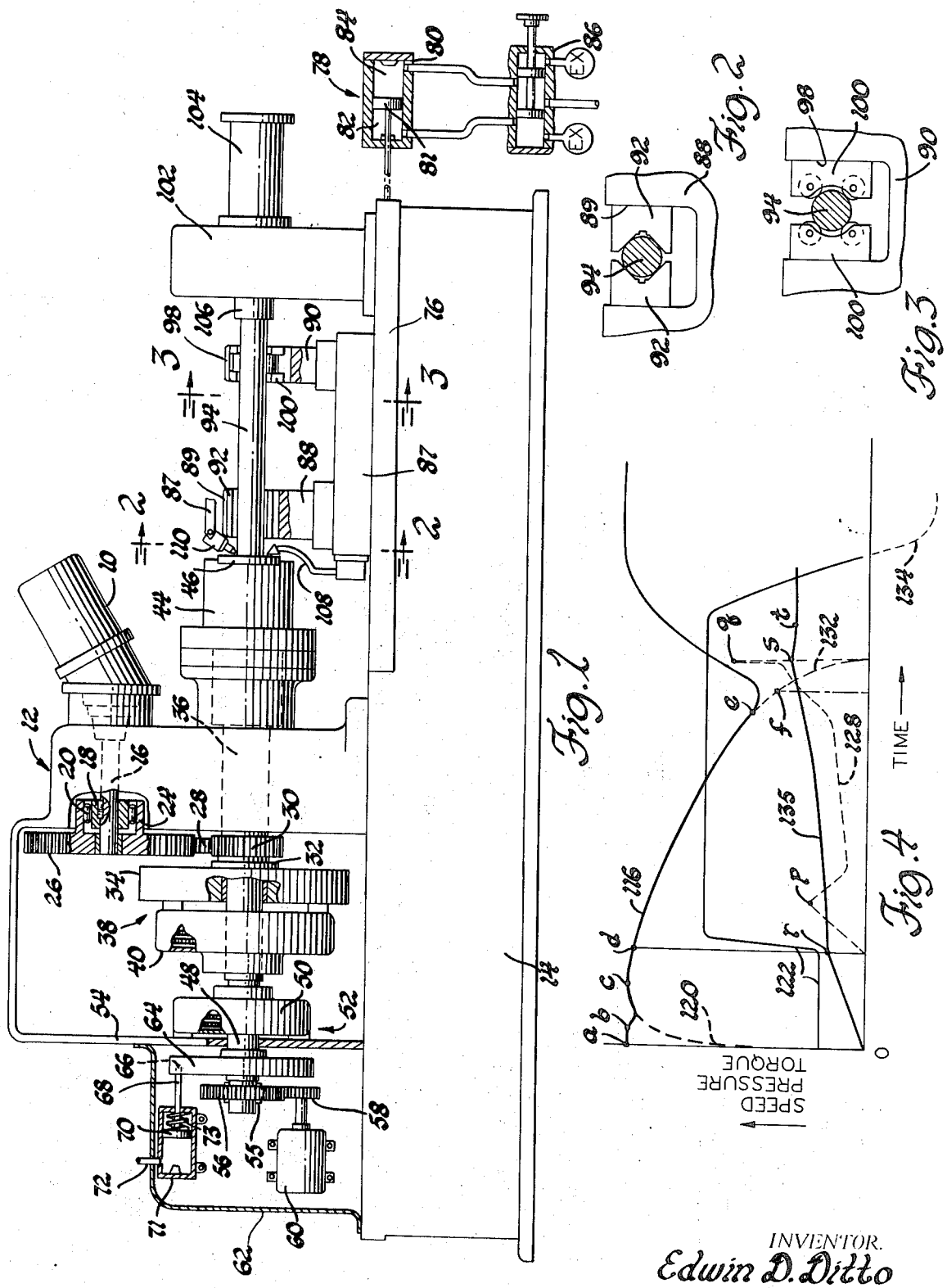

FRICTION WELDING METHOD

This invention relates to friction welding and friction welding methods incorporationg a continuously-rotating flywheel selectively released from driving one workpiece relative to another engaged under load after a first welding phase so that it may be accelerated back to welding speed for a subsequent welding operation minimizing power outlay as the energy remaining in the rotating workpiece holding chuck and connected drive spindle is employed to complete the weld in terminal welding phase.

In prior friction welding machines and processes the flywheel has been utilized to store energy for subsequently relatively rotating two workpieces pressed together at an interface by an axial force. The resulting heat of friction causes the interface initially to plasticize and finally solidify as flywheel speed and energy imparted to the interface decreases to zero. However, in prior art machines and processes employing all flywheel energy, the flywheel is completely halted by natural runout since this eliminates the requirement for brakes and since there is better working of the plasticized interface material during the process. To get the flywheel back to speed for a second welding operation requires a considerable time and the expenditure of large amounts of energy since the flywheel has to be accelerated from a rest position. Such machines and processes often do not meet the power and productivity requirements for mass production operations which limit their use.

In this invention a more advantageous method has been devised in which the flywheel is maintained in continuous rotation while the benefits of friction welding with a flywheel are maintained. The construction and method of this invention preferably involves a clutching operation to selectively connect and disconnect the flywheel with a rotatable spindle so that the weld can be achieved in a dual-phase welding operation.

In the present invention friction welding efficiency is materially improved by the use of the two-phase friction welding method in which a flywheel is driven to a predetermined energy level and then employed to drive a spindle, and a chuck with a workpiece relative to a second workpiece during a first phase or stage of operation. When sufficient energy has been used from the rotating flywheel to plasticize and work the interface, it is unclutched from the spindle. The kinetic energy remaining in the rotating spindle and chuck relatively rotates the workpieces to zero r.p.m. during a second phase of operation to complete the weld. During this time the flywheel is driven by a motor back to its original energy level to accomplish the friction welding of additional workpieces which will be subsequently loaded into the welding machine.

In this invention there is provision for braking the spindle and flywheel at any time during welding operations if needed. Also braking may be employed to quickly stop spindle rotation preferably after the flywheel is released to provide for a faster welding cycle if desired. This invention has new and improved construction for turning the welded workpieces after they have been welded together so that hot weld flash can be removed from the area adjacent to the weld interface by employing flash removal tools mounted on the welder. Furthermore, the invention provides for the improved positioning of a workpiece holding chuck to a station which facilitates the loading of workpieces into a chuck.

In addition to these features, objects and benefits above it is a further object of this invention to provide a new and improved friction welding method in which a flywheel is initially used to relatively rotate two workpieces engaged under load during a first phase of operation. The rotating flywheel is subsequently released prior to the completion of the weld so that it can be accelerated to a higher speed and energy level for a subsequent friction welding operation as the relative rotation of the workpieces diminishes down to zero during a terminal phase of operation.

Another object of this invention is to provide a new and improved method for the friction welding of workpieces together in which a flywheel is employed to relatively rotate the frictionally engaged workpieces during a first welding phase and wherein the workpiece holding chuck and part attached thereto are employed to subsequently relatively rotate the workpieces with braking by natural runout in a second phase of operation.

Another object of this invention is to provide a new and improved friction welder for the friction welding and finishing of workpieces welded together utilizing improved means for rotating the welded workpieces relative to workpiece finish-ing tool means which removes weld flash from the area adjacent to the weld joint.

These and other features, advantages and objects of the invention will become more apparent from the following detailed description and drawings wherein:

FIG. 1 is a side elevation view of a friction welder;

FIG. 2 is a cross-sectional view taken along line 2—2 of FIG. 1;

FIG. 3 is a cross-sectional view taken along lines 3—3 of FIG. 1;

FIG. 4 is a graph illustrating preferred methods of friction welding according to this invention.

In the preferred arrangement of this friction welder, shown in FIG. 1, there is a hydraulic motor 10 mounted in a headstock 12 which is fixed to a stationary base 14. The motor drives a longitudinally extending shaft 16 which is keyed to drive the inner race 18 of a one-way roller clutch 20. This clutch has an outer race inside of a hub 24 which is concentric with shaft 16 and which projects axially from a spur gear 26 toward the motor 10. Spur gear 26 meshes with an idler gear 28 that in turn meshes with a spur gear 30 that is keyed to a longitudinally projecting hub 32 fastened to a flywheel 34, rotatably mounted by suitable bearings on a longitudinally extending spindle 36. Adjacent to the flywheel is a selectively engageable and disengageable clutch 38 having a housing 40 secured for rotation with the flywheel 34. Clutch 38 has a first set of friction plates splined to the housing 40 and a second set of friction plates, interleaved with the first set, splined to the spindle 36. This clutch is applied and released by any suitable controls to selectively connect and disconnect the flywheel and the spindle 36.

As shown in FIG. 1, the forward end of the spindle is drivingly connected to a chuck 44 having a suitable workpiece retainer means such as disclosed in U.S. Pat. 3,627,189 issued Dec. 14, 1971, for "Friction Welder," for holding a workpiece illustrated in FIG. 1 as a flat metallic plate 46.

The rearward end of spindle 36 has an extension 48 secured thereto which projects through a housing 50 of a brake 52. This brake has a first set of friction plates splined on the spindle extension which are interleaved with a second set of friction plates splined to housing 50 which is secured to a vertical support wall 54 of the headstock. Any suitable control may be employed to selectively operate the brake 52 with the friction plates engaging to retard and stop rotation of the extension 48, and spindle 36 and the connected chuck 44.

Mounted on the spindle extension 48 by a one-way roller clutch 55 is a spur gear 56 adjacent to the end of the extension which meshes with a spur gear 58 that is driven by an auxiliary motor 60. As shown, this motor is mounted in a compartment 62 fixed to the wall 54 and the base 14. Operation of motor 60 will engage one-way clutch 55 and turn the gears 56 and 58, the spindle extension 48, spindle 36 and the attached chuck 44 for part loading and finishing purposes which will be later described. Also fixed to the spindle extension 48 within the compartment 62 is a positioning wheel 64 disposed between the spur gear 56 and the support wall 54. This positioning wheel has an opening 66 adjacent to its outer periphery which can receive the end of a positioning rod 68 that extends from a hydraulically operated piston 70 disposed in cylinder 71 that is secured within the housing 62. A control fluid can selectively be supplied to the piston through passage 72 to move it fowardly against the opposing biasing action of a release spring 73 into engagement with the side of wheel 64 and into the path of the opening 66. When the rod enters opening 66 the positioning wheel 64, spindle 36 and connected chuck 44 are stopped and held at a predetermined station that facilitates the loading of workpieces into the chuck by aligning the retaining jaws of the chuck with a feed chute of a loader.

Movably mounted on the base 14 by suitable rails or ways is a first slide 76 which is drivingly connected to a hydraulically operated cylinder 78 secured in a stationary support 80. The cylinder has a piston 81 therein which is drivingly connected to slide 76. The piston 81 forms chambers 82 and 84 that are hydraulically connected with a control valve 86 fed with hydraulic fluid so that the chambers may be selectively pressurized and exhausted to actuate the piston and move the slide 76 longitudinally on the support 14.

Supported on the first slide by suitable tracks or ways is a longitudinally movable second or feed slide 87. The second slide has secured thereto a part clamping upright 88 and a steady rest upright 90. As shown in FIG. 2 upright 88 is formed with an open upper end 89 that has opposing and laterally movable clamping jaws 92 which can be moved from a retracted position to the illustrated position to tightly grip and hold stationary the workpiece shown here as an elongated cylindrical metallic shaft 94. The steady rest upright 90 has an open upper end 98 with opposing and laterally movable roller cages 100 disposed therein to receive and support the end portion of the cylindrical shaft 94 to provide a steady rest for this workpiece. Any suitable mechanisms can be employed to move opposing jaws 92 and opposing roller cages 100 between the retracted or part loading position and the closed or part gripping position shown in FIGS. 2 and 3. Secured at the end of the slide 76 is an upright 102 in which there is fixed a hydraulic cylinder 104 having an axially movable ram 106 that engages the end of the workpiece 94 and provides the axial pressure on the workpiece necessary for friction welding.

Supported on the forward end of the slide 86 adjacent to the front upright 88 is a burner 108 and a grinder 110 which may be energized to remove hot weld flash after the parts have been welded together. Preferably these part finishing tools are movably supported on slide 87 and can be moved to a retracted position during the welding process.

For initially loading the welder the chamber 82 of cylinder 78 is pressurized while chamber 84 is exhausted so that the piston moves rearwardly to retract the slide 76 and secondary slide 87 mounted thereon to a part loading position. The clamping jaws 92 and roller cages 100 are retracted allowing the rod 94 to be fed into the uprights. The jaws and cages are then moved laterally to grip the workpiece 94, and the cylinder 78 is then actuated by charging chamber 84 and exhausting chamber 82 so that the piston moves the slide 76 to its forward position readying the machine for friction welding. During this time the chuck 44 is turned by motor 60 to the loading position established by supplying pressure fluid to piston 70 so that the end of rod 68 enters the opening 66 when it aligns with the rod which stops further chuck rotation. A workpiece 46 is fed into chuck 44 and the loaded parts are ready to be frictionally welded together after cylinder 71 is exhausted so that spring 73 moves the positioning rod 68 to the retracted position.

FIG. 4 illustrates the preferred method of welding the workpieces together. The moment of inertia of the flywheel, spindle chuck, the plate and other rotatable parts is known. The motor 10 driving through the engaged one way clutch 18 drives the flywheel 34 up to a predetermined angular velocity and energy level represented by point $a$ on flywheel speed curve 116. At point $b$ the clutch 38 is engaged so that the speed of the spindle 36, chuck 44 with workpiece 46 secured thereto rapidly accelerates from zero rpm to flywheel speed as shown by chuck speed curve 120. At point $c$ the motor 10 is deenergized so that the kinetic energy of the flywheel, the spindle, chuck and workpiece is used to rotatably drive the workpiece 46 relative to workpiece 94. Overrun of the motor 10 occurs at this time being provided by one-way roller clutch 20. Also the one-way clutch 55 disengages so that the auxiliary motor 60 is disconnected from the drive. Curve 122 represents the pressure in hydraulic cylinder 104 which provides an axial force on shaft 94 moving slide 87 forwardly. At point $d$ on the speed curve 116 there is part contact by the end of shaft 94 with the plate 46. The pressure in cylinder 104 is increased to provide a higher and constant pressure at the weld interface. After workpiece engagement with torque transmitted at the interface represented by curve 128 increases to a peak $p$ where the heat of friction plasticizes the interface. The relative rotation of the workpieces under load continues for a predetermined time so that there is further heating and working of the plasticized interface material. When sufficient kinetic energy has been transformed into heat at the interface which may be readily determined from the drop in flywheel speed or empirically determined by the number of flywheel revolutions, the clutch 40 is disengaged, there being sufficient kinetic energy stored in the spindle 36, chuck 46 and other parts connected thereto to complete the weld in a final phase of operation. Any suitable device or pickup may be employed to provide information as to the velocity of the flywheel and chuck as well as the number of revolutions made by these components. A typical flywheel disconnect point is shown as point $e$ on curve 116. Curve 132 shows the rapid decrease of chuck speed to zero during this final phase as the plasticized material hardens and the torque transmitted by the weld interface rapidly increases to its maximum peak at point $q$ as shown by the torque curve 128. At this point the parts are fully welded together. As shown by curve 122 the upset pressure at the interface is maintained for a predetermined time as the weld begins to cool. Subsequently, the pressure in the cylinder 104 is rapidly reduced until the ram retracts as shown by the negative dashed line segment 134 of curve 122.

With the rotating flywheel released at a predetermined speed represented at point $e$ on the curve 116, the motor 10 is restarted to drive the flywheel 34 back up to speed with the one-way roller clutch 20 engaged. This substantially reduces the amount of power consumed for flywheel friction welding with flywheels since the flywheel is continuously rotating and does not require acceleration up to speed from rest or stopped position.

Curve 135 of FIG. 4 represents movement of the ram 106. At point $r$ the ram contacts the end of shaft 94, the amount of upset of metal at the weld interface is represented by the rise of curve from point $r$ to point $s$ where relative rotation has stopped. The negative slope of curve 122 from point $s$ to point $t$ shows part shrinkage as it cools.

After the ram 106 is retracted and the clamping jaws 92 are released, motor 60 can drive the welded workpieces. The burner 108 and grinder 110 are moved into position and employed to remove any flash as the welded piece is turned as a unit. After this the piston 78 is employed to retract slide 76 returning it to the loading position, with the welded part removed from the chuck being sufficiently gripped by the roller cages 100 for this purpose. The cages 100 are subsequently retracted and the welded members 46 and 94 are removed from the uprights 88 and 90 and a new shaft 94 is loaded into the uprights. During this time the motor 60 is again energized to rotate the chuck 44 to a loading position as determined by pin 68 with the positioning controls activated.

The brake 50 may be used to advantage to brake the rotation of the spindle 36 and chuck 44 holding the workpiece 46 at any time to interrupt the weld cycle. This allows unacceptable parts to be removed from the machine without going through a complete welding cycle. If braking is desired for a welding cycle brake 52 can be engaged preferably after the release of the spindle from the flywheel from point $f$ to 0 r.p.m. This will provide for quicker stopping of the relative rotation to shorten weld times.

It will be appreciated that modifications and variations can be made to preferred friction welding method disclosed above without departing from the spirit of the invention. Accordingly the scope of this invention is set forth in the following claims.

I claim:

1. A method of friction welding two workpieces together comprising mounting a first workpiece in a rotatable chuck, mounting a second workpiece in a workpiece holder for holding said second workpiece from rotation relative to said first workpiece, driving a flywheel by motor means to a predetermined rotary speed and energy level, subsequently drivingly connecting said flywheel to said chuck so that said flywheel and said chuck and said first workpiece are driven up to a predetermined speed and energy level by said meter means, disconnecting said motor means from driving connection with said flywheel and said chuck, relatively moving the two workpieces until they frictionally engage at a common interface, providing a predetermined pressure on said workpieces so that said workpieces are engaged under load and are heated by frictional rubbing until the interface plasticizes, releasing said flywheel from the drive of said chuck after a predetermined part of the kinetic energy stored in said flywheel has been transformed into heat energy at said interface so that only the remaining kinetic energy of said chuck and said first workpiece relatively rotates the workpieces along while the rotating flywheel is again driven up to said predetermined rotary speed and energy level by said motor means, allowing the rotating chuck and workpiece held thereby to decelerate in speed down to zero to complete the welding of said first and second workpieces, and allowing the workpieces to cool.

2. A method of friction welding separate metallic workpieces together comprising the steps of securing a first workpiece in a rotatable chuck, securing a second workpiece in a workpiece holding fixture spaced from said first workpiece so that said workpieces can be rotated relative to each other, energizing motor means, storing a predetermined amount of kinetic energy in a flywheel by driving said flywheel to a predetermined speed and energy level with said motor means, selectively drivingly connecting said chuck to said flywheel while said flywheel is being driven by said motor means, releasing said flywheel and said chuck from said motor means so that the energy stored in said rotating flywheel and said chuck rotatably drives said first workpiece relative to said second workpiece, relatively moving said workpieces so that said workpieces engage at a common interface under a controlled pressure and so that said interface is heated by friction to form a plasticized bond as the speed of said rotating flywheel and chuck decreases to a predetermined speed, releasing said rotating flywheel from the drive of said chuck so that said flywheel can be accelerated by said motor means to a predetermined speed and energy level for the subsequent friction welding of other workpiece, utilizing the kinetic energy remaining in the rotating and decelerating chuck to work said plasticized bond until the reaction torque of the bond halts relative rotation of said workpieces and the rotation of said chuck, and removing the frictionally welded workpieces from said chuck and said workpiece holding fixture.

3. A method of friction welding separate workpieces together by introducing a controlled amount of kinetic energy into the workpieces through rotational friction engagement of the workpieces at a common interface comprising energizing motor means, rotatively driving a flywheel associated with one of the workpieces by said motor means before the workpieces are engaged at a common interface, connecting a chuck member holding a first workpiece to the rotating flywheel, rotatably driving said flywheel and said chuck member and workpiece held thereby to an angular velocity to store kinetic energy sufficient to provide the heat energy to weld the workpieces together, releasing said motor means from the drive of said flywheel and said chuck member so that said flywheel and said chuck member rotatably drive the workpieces relative to each other, subsequently converting the kinetic energy in the rotating parts to heat at the interface by engaging the workpieces in rubbing contact at the interface under a controlled pressure while the speed of relative rotation at the interface decreases and the interface is heated to a plastic condition, forming a bond as the speed of the engaged surface decreases to a predetermined speed, releasing the flywheel from the drive of said chuck member while still rotating and using the kinetic energy remaining in the rotating chuck and workpiece after the bond material is formed to work the bond material until the relative rotation of the workpieces is stopped.

4. A method of friction welding two workpieces together comprising mounting a first workpiece in a rotatable chuck, mounting a second workpiece in a workpiece holder, energizing a drive motor driving a flywheel by said drive motor to a predetermined rotary speed and energy level, clutching said flywheel to said chuck so that said chuck and said first workpiece are driven by said drive motor along with said flywheel up to a predetermined speed and energy level, uncoupling said drive motor from said flywheel and said chuck and said first workpiece held thereby so that said flywheel and said chuck rotate said workpieces relative to each other while gradually decelerating, relatively moving the two workpieces longitudinally until they frictionally engage at a common interface, providing an axial pressure so that the two workpieces engaged under load at a common interface are heated by frictional rubbing until the interface plasticizes, releasing the flywheel while it is rotating after only a portion of the kinetic energy stored in the flywheel has been transformed into heat energy at said interface so that the rotational energy of said chuck and first workpiece relatively rotates the workpieces alone while the rotating flywheel is again driven up to said predetermined speed and energy level, allowing the chuck and workpiece held thereby to further decelerate in speed down to zero to complete the weld of the two workpieces together.

* * * * *